(12) United States Patent
Martin et al.

(10) Patent No.: US 7,770,174 B1
(45) Date of Patent: Aug. 3, 2010

(54) CLIENT-BASED RESOURCE MANAGER WITH NETWORK-BASED RIGHTS ACQUISITION

(75) Inventors: Geoff S. Martin, Overland Park, KS (US); Jonathan R. Kindred, Gardner, KS (US); Brian R. Landers, Leawood, KS (US); Kevin E. Hunter, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1451 days.

(21) Appl. No.: 11/151,387

(22) Filed: Jun. 13, 2005

(51) Int. Cl.
*G06F 9/46* (2006.01)
*G06F 15/173* (2006.01)
*G06F 21/00* (2006.01)
*H04L 9/32* (2006.01)

(52) U.S. Cl. ........................ 718/104; 713/168; 713/182; 709/226

(58) Field of Classification Search ................. 718/104; 709/223–226; 705/34, 40; 713/168, 182
See application file for complete search history.

(56) References Cited

U.S. PATENT DOCUMENTS

| | | | | |
|---|---|---|---|---|
| 6,732,278 B2 * | 5/2004 | Baird et al. | ..................... | 726/7 |
| 7,266,519 B2 * | 9/2007 | Chandhok et al. | .............. | 705/34 |
| 7,275,258 B2 * | 9/2007 | Arbab et al. | .................... | 726/6 |
| 7,465,231 B2 * | 12/2008 | Lewin et al. | ................... | 463/37 |
| 2002/0087553 A1 * | 7/2002 | Kitahara et al. | ............... | 707/10 |
| 2003/0237006 A1 * | 12/2003 | Himmel et al. | ............. | 713/202 |
| 2005/0055309 A1 * | 3/2005 | Williams et al. | .............. | 705/40 |
| 2006/0284892 A1 * | 12/2006 | Sheridan | ..................... | 345/661 |
| 2007/0232263 A1 * | 10/2007 | Chandhok et al. | ........... | 455/406 |

* cited by examiner

*Primary Examiner*—Meng-Ai An
*Assistant Examiner*—Tammy Lee

(57) ABSTRACT

A method and apparatus for managing data resources on a computing device. One or more data resources are pre-loaded on the device but are not accessible to application programs on the device. A resource manager sits on the device as an intermediary or gatekeeper to manage the data resources. The resource manager maintains a set of access-rights data that indicates for each of the data resources whether a right exists to access the data resource. In response to a request to access or add a given one of the pre-loaded but not yet accessible data resources, the resource manager invokes a network-based rights-acquisition session through which the device acquires a right to access the data resource. The access-rights data is then updated to reflect that an access-right exists, and access is thereafter allowed.

14 Claims, 7 Drawing Sheets

| DATA RESOURCE | ACCESSIBLE? | ACCESS KEY | NETWORK ADDRESS |
|---|---|---|---|
| RESOURCE 1 | Y | KEY 1 | |
| RESOURCE 2 | N | | URL-2 |
| RESOURCE 3 | N | | URL-3 |
| RESOURCE 4 | Y | KEY 4 | |
| RESOURCE 5 | N | | URL-5 |
| RESOURCE 6 | Y | KEY 6 | |

FIG. 2

CLIENT-BASED RESOURCE MANAGER WITH NETWORK-BASED RIGHTS ACQUISITION

FIELD OF THE INVENTION

The present invention relates to computing devices and, more particularly, to management of program resources on such a device.

BACKGROUND

A typical computing device contains a processor and one or more stored application programs that are executable by the processor to carry out various useful functions. The device may also include a user interface, such as a display screen and keypad, through which a user can invoke a desired program, and through which the user can provide input to the program and receive output from the programs.

In general, each application program on the computing device may employ one or more data resources in order to provide basic or enhanced features and functions. The data resources, which are also typically stored on the device, can take the form of additional program routines (e.g., code libraries or modules) executable by the processor and/or reference data (e.g., parameter values) usable by the processor to tailor operation of the application program in some manner.

Numerous application programs and associated data resources exist now, and others will be developed in the future. By way of example, and without limitation, two example application programs are a channel-presentation program and a skin-rendering program.

A channel-presentation program functions to receive a user selection of a desired subject-matter channel and to responsively present the user with information regarding that subject matter. Such a program can include a number of channel-definitions (e.g., discrete files or other sets of data), each of which may constitute a respective data resource for the program. Each channel-definition, for instance, may designate a particular subject (e.g., movies, sports, weather, stock market, etc.) and may specify one or more network addresses (e.g., URLs) from which the device should download relevant information for presentation when the user tunes to the channel. Some channel-presentation programs may automatically background-download the information for each defined channel so that the information is readily available for presentation to the user whenever the user tunes to a channel.

A skin-rendering program functions to render a selected user-interface theme or "skin." Each skin may be defined by parameters set forth in a respective skin-definition file (e.g., XML-based file) or other data that constitutes a data resource for the skin-rendering program. In particular, each skin-definition file may designate specific user-interface attributes such as button and menu graphics, background images, screen-savers, borders, cursor graphics, color schemes, fonts, ringtones and other sounds, and relative arrangement of user interface components, among others. In practice, a user may invoke the skin-rendering program and select a desired skin, and the program may then render the selected skin so as to give the user-interface of the device (or of a specific program) a desired look and feel.

Advantageously, many computing devices or application programs are further arranged to allow installation of additional data resources, so as to allow a user to enhance or modify program performance. Generally, a user may install a new data resource on a device by downloading the data resource from a web site and then invoking any necessary installation function to store the data resource in a predefined location on the device and to integrate the data resource with one or more existing application programs.

For example, using a generic web browser or a program designed specifically to allow acquisition of data resources, a user may interact with an online "vending machine" website that offers a variety of data resources for purchase or for free download. Through such a vending machine, the user may download a new data resource, such as a channel-definition file directed to particular subject (e.g., "health and fitness", "outdoor sports", etc.) or a skin-definition file of a particular type (e.g., a top-40 music themed skin, for instance). Depending on the device/program configuration, the device may then automatically install the downloaded data resource, or a user may manually direct installation of the data resource on the device.

A problem with this existing method of adding new data resources, however, is that it can enable a user to intentionally or inadvertently install rogue or malicious data resources, which can unfortunately jeopardize the performance and stability of the device or application programs. This can be a particular problem if the application program that will use the data resource is core function of the device. For instance, a cell phone or wirelessly-equipped PDA may include a channel-presentation program and a skin-rendering program as basic features of the device. Before a manufacturer or distributor of such a device distributes the device to an end user, the manufacturer or distributor would thoroughly test those programs and their associated data resources to ensure their proper operation. If a user could then add other data resources after the fact, a risk exists that the added data resources might be untested and might render the device or application programs unstable or inoperable.

To avoid this risk, device or application program designers may structure the device or application programs to specifically preclude installation of new data resources. For instance, a program designer may simply not include in an application program a feature that allows the application program to access newly added data resources. Or a device manufacturer or program designer may store the application program and its data resources in a protected memory space of the device where a user cannot store additional data resources.

Unfortunately, however, precluding the addition of new data resources is inherently problematic, since it prevents users from adding desirable program functions or features to their computing devices. For instance, a user may be precluded from adding a new channel-definition directed to a subject matter of interest to the user or a new skin-definition having a theme of interest to the user. Consequently, an improvement is desired.

SUMMARY

This present invention provides an improved mechanism for managing data resources on a computing device and for facilitating the addition of new data resources. As described herein, the computing device will be pre-loaded with a plurality of data resources, some of which may be accessible by application programs on the device, but others of which will be inaccessible until the user/device acquires an access-right from a network server.

Advantageously, the computing device will further include a centralized data resource manager that maintains a discrete set of access-rights data indicating, for each of the data resources, whether a right exists to access the data resource. Generally speaking, the resource manager will function to determine from the access-rights data whether a right exists to access a particular data resource. If the resource manager thereby determines that a right does not exist to access the data resource, the resource manager will then invoke a network-based rights-acquisition session, through which the user/device can acquire a right to access the data resource. Upon acquisition of an access right, the resource manager may then update the access-rights data to indicate that an access right exists.

In one embodiment, the resource manager may thus function as an intermediary with respect to data-resource access-requests provided by application programs. In practice, an application program may obtain from the resource manager a listing of data resources, and the user may select a desired data resource to use. The application program may then seek to access (e.g., load, run, etc.) the data resource. At that point, the resource manager may intermediate on the access request, as noted above, to determine whether an access right exists and, if not, to invoke a network-based rights-acquisition session.

In another embodiment, the resource manager may work with, or function as, an application management system (AMS) through which a user can "add" new data resources to the device. As such, acting like a data resource vending machine, the resource manager can present the user with a listing of data resources that are available for the user to acquire. (In reality, the listing would include data resources pre-loaded on the device, but the user may perceive such data resources to not yet be on the device and to be available for download.) The user may then select a desired data resource to "add" to the device. In response, the resource manager may determine from the access-rights data whether a right already exists to access the requested data resource and, if not, may invoke a network-based rights-acquisition session.

Advantageously, this mechanism provides a way for a user to "add" program resources that are in fact already present on the computing device and that may be tested in advance to ensure their interoperability with the device and application programs. Further, the mechanism facilitates management of those program resources in a centralized manner, by providing access-rights data that is accessible independently of the data resources themselves.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 2 is an example access-rights table maintained by the exemplary computing device.

DETAILED DESCRIPTION

Generally speaking, any of a variety of computing devices can be arranged to carry out the present invention. Examples of such devices include, but are not limited to, a personal computer, a personal digital assistant (PDA), a cellular phone, and a home or business appliance (e.g., a kitchen or laundry appliance, a ventilation system, a security system, etc.) The computing device can be a fixed-position device, such as a desktop personal computer or heavy appliance. Alternatively, the device can be a portable device, such as a notebook computer or handheld PDA or cell phone. Other examples are possible as well.

Figure 1:
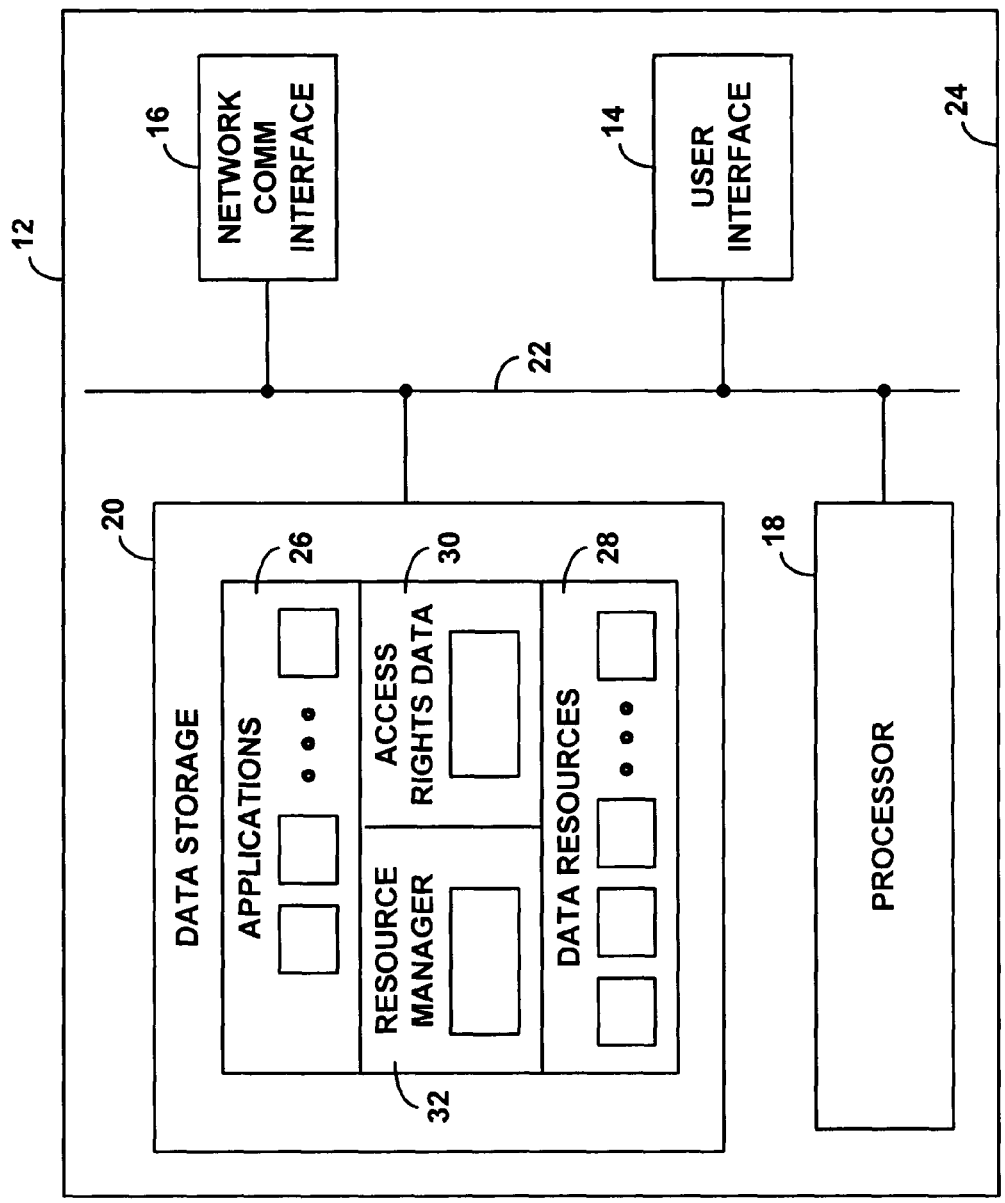
FIG. 1 is a block diagram depicting functional components of a computing device arranged to implement an exemplary embodiment of the invention.

FIG. 1 is a block diagram depicting functional components of a computing device 12 arranged in accordance with an exemplary embodiment of the invention. It should be understood, of course, that this and other disclosure provided throughout this document are intended to be examples only and that numerous variations are possible. For instance, structural and functional elements can be modified, re-ordered, added, excluded, combined, distributed, or changed in other ways while remaining within the scope of the appended claims.

As shown in FIG. 1, the exemplary device 12 includes a user interface 14, a network communication interface 16, a processor 18, and data storage 20, all of which may be coupled together by a system bus or other mechanism 22 and housed within a unitary or multi-part housing 24.

User interface 14 preferably includes input and output components for receiving input from a user and for providing output to a user. Example input components include a keypad or keyboard, a touch-sensitive LCD panel, a mouse or joystick, a microphone, and a video camera. Example output components include an LCD display screen, an audio speaker, and a mechanical-vibration mechanism. The user interface may also include circuitry and other components to facilitate interfacing with a user, such as analog-to-digital (and digital-to-analog) conversion circuitry for instance.

Network communication interface 16 preferably facilitates communication with a computer network, so as to allow a network based rights-acquisition session as will be described more below. As such, network communication interface 16 can comprise a simple Ethernet network interface module adapted for connection with an Ethernet cable that extends to a router or other network element. Alternatively, the network communication interface 16 can comprise a wireless network interface for providing wireless connectivity with a local or wide area network. A wireless network interface could be a WLAN interface, such as an 802.11 interface, that communicates with a WLAN access point connected with a packet-data network. Alternatively, a wireless network interface could be a WWAN interface, such as a CDMA or GSM interface, that communicates with a cellular radio access network connected with a packet-data network. A typical wireless network interface includes a dedicated chipset (e.g., DSP, ASIC, etc.) and one or more antennas for engaging in wireless network communication.

Network communication interface 16 can also comprise a local direct-connection mechanism, such as a USB, FIREWIRE, Infrared, or BLUETOOTH port through which device 12 can connect and communicate with another device that provides network connectivity. For instance, network communication interface 16 can comprise a USB or BLUETOOTH port for connecting with an external computer or modem that in turn includes a network communication interface through which the device can communicate with a network server.

Processor 18 preferably comprises one or more general purpose processors (e.g., INTEL microprocessors) and/or one or more dedicated or special-purpose processors (e.g., DSPs, ASICs, etc.). Data storage 20, in turn, preferably includes one or more volatile and/or non-volatile storage components such as random access memory, Flash memory, hard drive storage, or the like. Further, data storage 20 can comprise magnetic, optical, organic, or other sorts of storage components and can be integrated in whole or in part with processor 18.

In accordance with the exemplary embodiment, as shown, data storage 20 contains one or more application programs 26, a plurality of data resources 28, a set of access-rights data 30, and a resource manager 32, among possibly other data as well.

Example application programs 26 and data resources 28 include the channel-presentation program and skin-rendering program discussed above. Other examples of application programs and data resources are possible as well, but the two examples will be used here to explain operation of the device.

In a preferred embodiment, some or all of the data resources can be encrypted so that they can be read only with use of a decryption key. Any known encryption/decryption algorithm can be used for this purpose, and a different decryption key can be provided respectively for each data resource. Alternatively, all of the data resources can be plaintext (i.e., not encrypted) and thus freely readable, subject to approval by the resource manager as will be described more below.

Access-rights data 30 preferably comprises a table (e.g., a delimited listing or a structured database table) that lists each of the data resources 28 and provides information regarding rights to access each of the data resources by the application programs. FIG. 2 depicts an example access-rights table, although numerous other arrangements are possible as well. Preferably, the access-rights table exists independently of the data resources that are referenced by the table, so the resource manager can simply refer to the access-rights table to determine whether an access-right exists, without having to read any parameters in the data resource (e.g., the data resource file) itself.

As shown in FIG. 2, each row (or record) of the example access-rights table sets forth information regarding a respective data resource and may thus be considered a data resource record. Each data resource record then comprises a number of fields defined by columns of the table.

Preferably, a first field 40 of each data resource record contains a string or numeric value that identifies the data resource by name, memory handle, or other value that an application program would use to call the data resource. That way, the resource manager 32 can readily locate the relevant row of the table when faced with a request to access or add a particular data resource.

Another field 42 of each data resource record contains a Boolean value indicating whether or not a right exists to access the data resource. In one embodiment, the access-right can be a blanket right for all application programs to access the data resource. In another embodiment, the access-right can be application-specific, in which case multiple Boolean fields can be provided, each specifying whether a particular application has the right to access the data resource.

Yet another field 44 of each data resource may contain, if applicable, an access-key that enables access to the data resource. For instance, if a data resource is encrypted, the access-key may be a decryption key that facilitates decryption of the data resource so that an application can read and use the data resource. Alternatively, the access key may be a simple authorization code or other value that indicates authorization to access the data resource has been acquired. The Boolean value of field 42 may alternatively serve this purpose.

Still another field 46 of each data resource may contain, if applicable, a network address from which the user/device can acquire a right to access the data resource. The network address may be URL, IP address, or other address of an online vending machine or a particular webpage, for instance, with which a user can interact by HTTP or another protocol to purchase or otherwise acquire the right to access the data resource.

Advantageously, access-rights data 30 is arranged to be accessed by processor 18 independently of the data resources listed in the access-rights data. For instance, the access-rights table of FIG. 2 can be maintained in data storage 20 separately from the referenced data resources. That way, the processor 18 can refer to the access-rights data to determine whether a right exists to access a particular data resource and can allow the access to occur only if an access right exists.

Resource manager 32 comprises program instructions (e.g., machine language instructions) executable by processor 18 to perform the core function of managing access rights for the various data resources. In one embodiment, to facilitate this, the application programs 26 may be structured to send all of their data-resource access requests to resource manager 32, so that resource manager 32 can allow or disallow those requests depending on whether an access right exists, and can invoke a network-based rights acquisition session if appropriate. Alternatively, the resource manager can be designed as part of the device operating system to intermediate on basic file calls, such as "Load( )" or "Run( )" for instance, so that the resource manager can allow or disallow those calls. Still further, the resource manager can work with, or constitute, an application management system (AMS) as described above, to enable a user to "add" a data resource by acquiring an access-right.

Preferably, before device 12 is distributed to an end user, a manufacturer or distributor will provision the device with the various components shown in FIG. 1, including the application programs 26, the data resources 28, the access-rights data 30, and the resource manager 32. Thus, when a user acquires the device, the device will include certain application programs with certain data resources. As shown in FIG. 2, one or more of the data resources may be inaccessible, until the user/device acquires an access-right, and one or more of the data resources may be accessible from the start.

Figure 3:
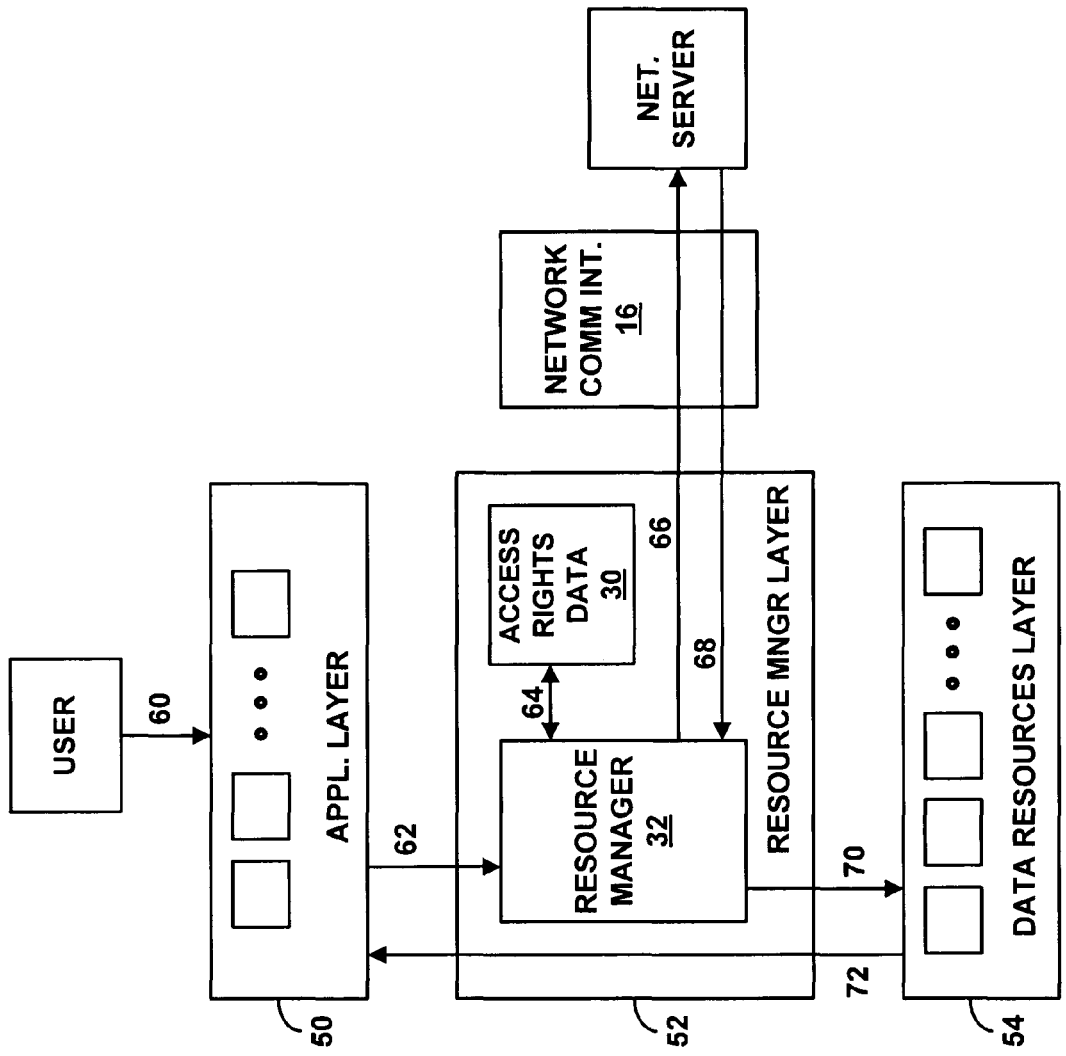
FIG. 3 is a block diagram depicting logical arrangement of components in the exemplary computing device.

FIG. 3 next depicts a preferred logical arrangement of the application programs 26, data resources 28, access-rights data 30, and resource manager 32. As shown in FIG. 3, device 12 preferably includes three distinct logical layers: an application layer 50, a resource manager layer 52, and a data resource layer 54. The application layer 50 contains the application programs 26; the resource manager layer 52 contains the resource manager 32 and the access-rights data; and the data resource layer 56 contains the data resources 28.

As such, the resource manager layer 52 sits logically between the application layer 50 and the data resource layer 54. That way, the resource manager layer 52 can intermediate on requests to add or access various data resources. Further, as shown, the resource manager layer 52 (e.g., resource manager 32) logically communicates with the network communication interface 16, to facilitate access-right acquisition.

Figure 4:
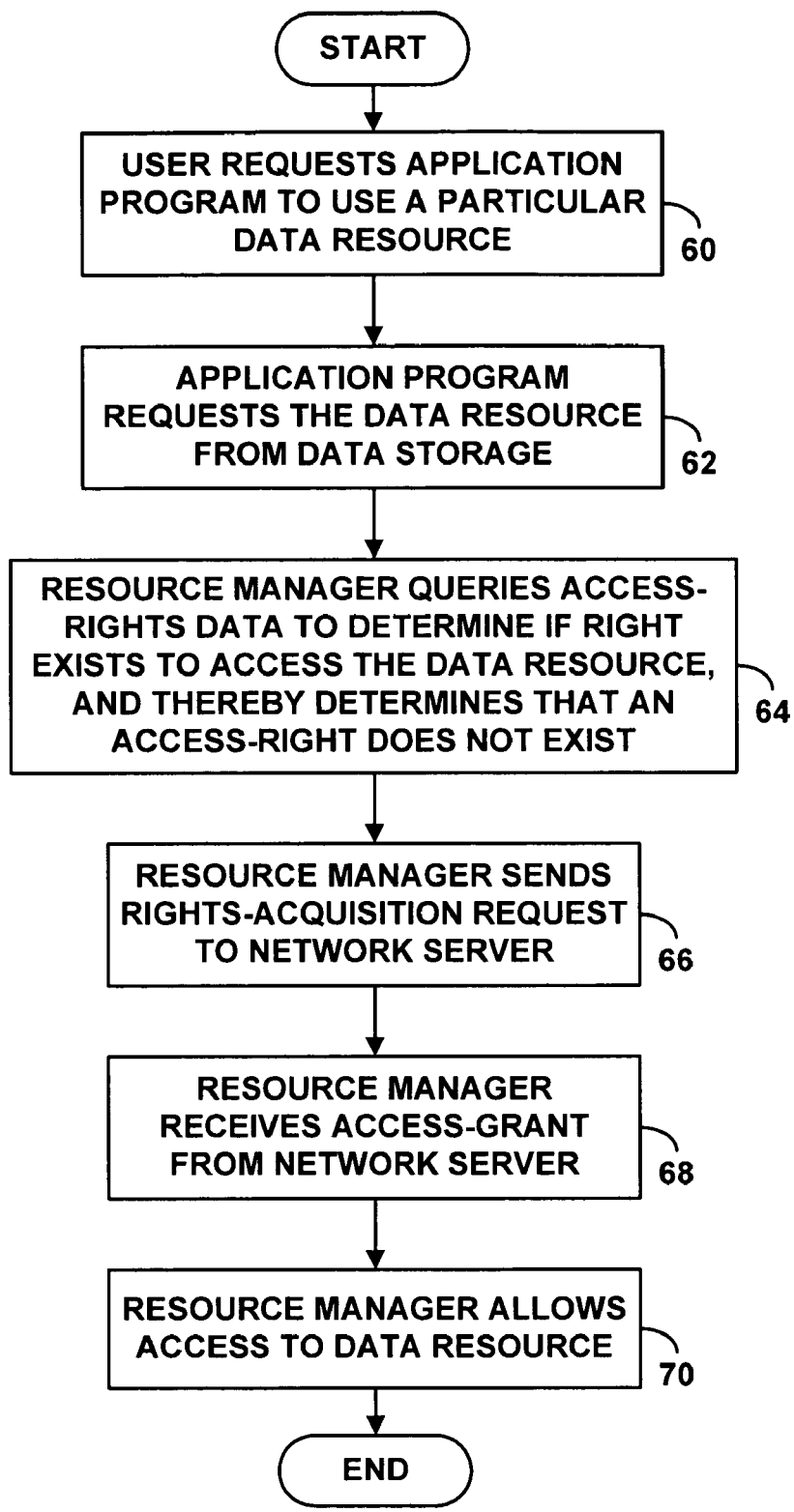
FIG. 4 is a flow chart depicting functions involved in an application gaining access to a data resource.

FIGS. 3 and 4 both illustrate an example of how the invention may operate in practice, in a scenario where an application program seeks to gain access to a data resource, and the resource manager intermediates on the access request and invokes a network-based rights-acquisition session.

As shown in both figures, at step 60, a user may request an application program to use a particular data resource. For instance, if the application program is a channel-presentation program, a user may request the channel-presentation program to tune to a particular channel (i.e., to use a particular channel-definition). More particularly, the user may invoke a function of the channel-presentation program to view a listing of available channels, and the channel-presentation program may responsively obtain (from resource manager 32 or directly from the access-rights data 30) a listing of available channels (e.g., both accessible and inaccessible channels). The user may then select a desired channel from the list. Similarly, if the application is a skin-rendering program, the user may request the skin-rendering program to use a particular skin (i.e., to use a particular skin-definition).

At step 62, in response to the user the user request, the application program requests the particular data resource from data storage 20, such as by issuing a "Run( )" or "Load( )" operating system call that identifies the data resource as an argument. As shown in FIG. 3, the resource manager 32, functioning as an intermediary for such requests, preferably receives the access request. At step 64, the resource manager 32 then consults the access-rights data 30 to determine whether a right exists to access the requested data resource.

If the resource manager 32 thereby determines that a right does not exist to access the requested data resource, then the resource manager 32 invokes a rights-acquisition session. In particular, at step 66, the resource manager may send a rights-acquisition request to the network server, and, at step 68, the resource manager may receive in response from the network server an access-grant message. If applicable, the access-grant message may provide the resource manager with a decryption key, which the resource manager may use to decrypt the data resource (immediately, or upon request from an application program). Alternatively, the access-grant message may simply provide a flag or authorization code indicating that access is granted. Preferably, the resource manager will update the access-rights data to indicate that a right now exists to access the data resource.

More particularly, the rights-acquisition session may involve interaction between the user and the network server, either directly, or indirectly through the resource manager. For instance, the resource manager may first present the user (via user interface 14) with a predefined (or partially pre-defined) prompt requesting user approval to engage in the rights-acquisition session and optionally requesting payment information (e.g., credit card number, or account authorization) from the user. Once the user thereby approves the rights-acquisition and provides payment information (if requested), the resource manager may then send the user's payment information in a rights-acquisition request (e.g., an HTTP request message) to the network server and may receive from the network server in response a decryption key, flag, authorization code, or other access-grant. The resource manager may then update the access-rights data accordingly.

At step 70, after acquiring a right to access the data resource, or after determining that the access-right exists already, the resource manager then allows the requested access. For example, if the application program had issued a "Load( )" or "Run( )" or call in an effort to load or run the data resource, the resource manager may pass that call to the operating system, the file management system, or the like. Consequently, at step 72, the application program will gain access to the data resource.

As a specific example, if the application program is a channel-presentation program, the channel-presentation program may thereby gain access to a requested channel-definition file. And as another example, if the application program is a skin-rendering program, the skin-rendering program may thereby gain access to a particular skin-definition file.

Figure 5:
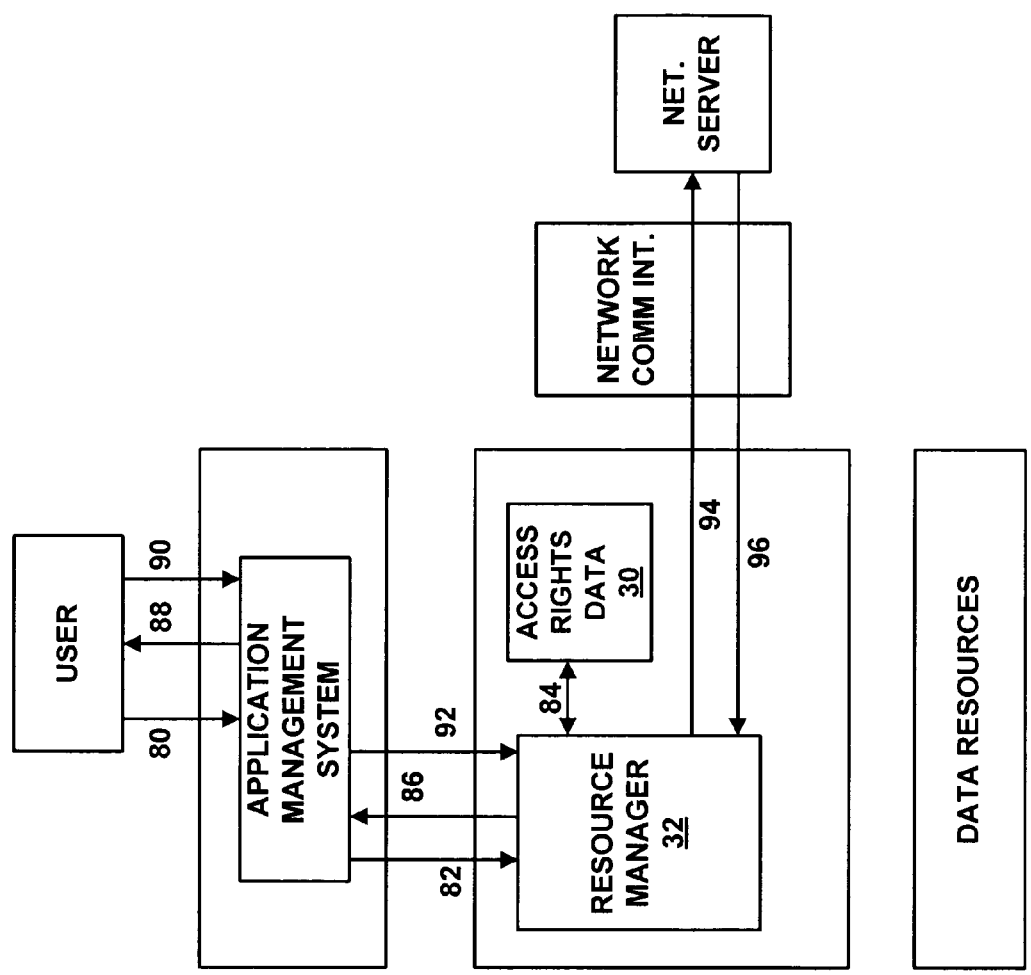
FIG. 5 is a block diagram depicting logical arrangement of components including an application management system.
Figure 6:
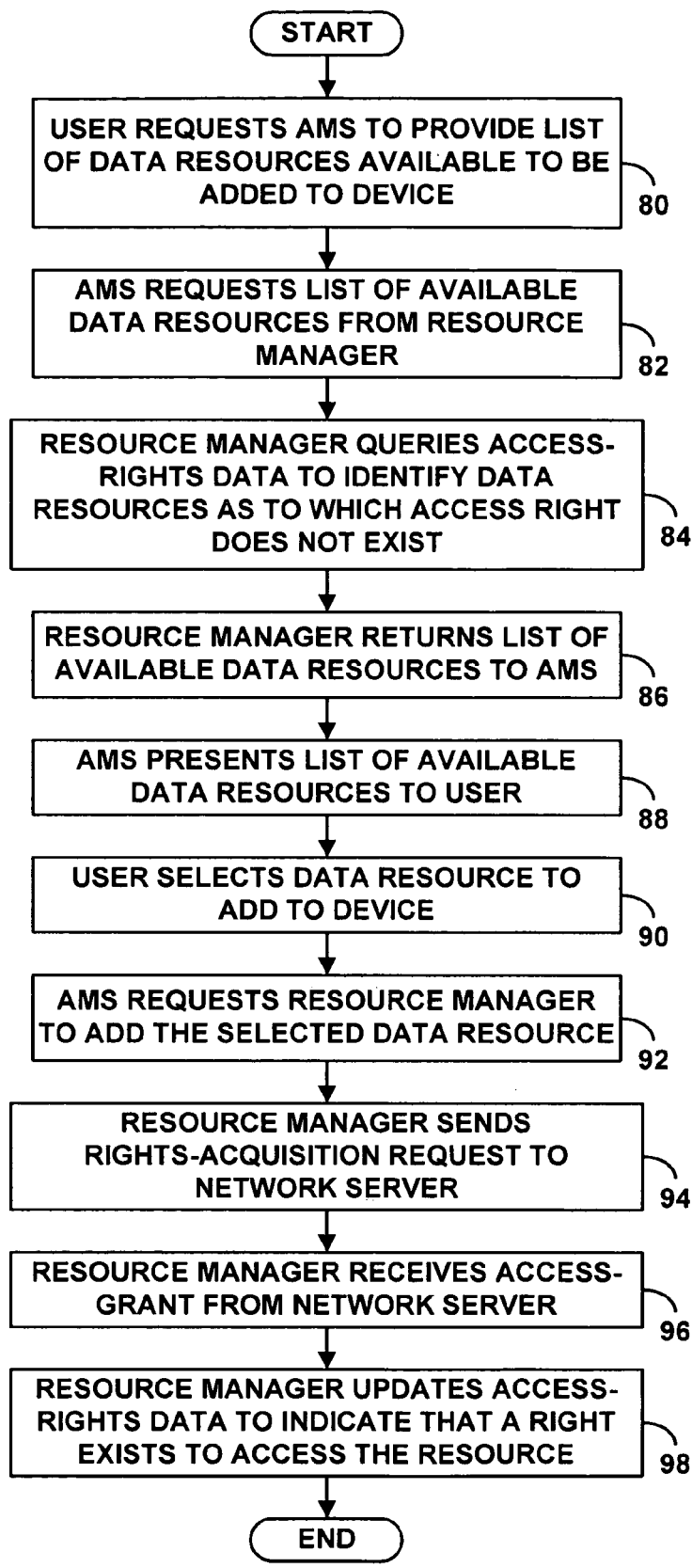
FIG. 6 is a flow chart depicting functions involved in using an application management system to add a new data resource.

FIGS. 5 and 6 next depict another example of how the invention may operate in practice, in a scenario where the user interacts more directly with the resource manager or with an application management system (AMS) to browse available data resources and to "add" a desired data resource to the device. This arrangement is quite similar to that shown in FIGS. 3 and 4, except that the user interacts principally with an AMS to request addition of a data resource, rather than interacting with another application program (like a channel-presentation program or skin-rendering program) to request use of a particular data resource. As shown in FIG. 5, the AMS can itself sit in the application layer 50.

In this embodiment, at step 80, a user may request the AMS to provide a list of data resources available to be "added." In response, at step 82, the AMS may request the resource manager 32 to provide a list of the pre-loaded data resources as to which access-rights do not yet exist. To respond to this request, at step 84, the resource manager may query the access-rights data to determine which data resources do not yet have access rights, by determining for each listed data resource whether a right exists to access the data resource. And, at step 86, the resource manager may return a set of the available data resources to the AMS. At step 88, the AMS may then present that set of available data resources (via user interface 14) to the user.

At step 90, the user may then select a particular one of the available data resources to acquire. In response, at step 92, the AMS may send a request to the resource manager to add the selected data resource. Since an access-right does not exist for the selected data resource, the resource manager may then invoke a network-based rights-acquisition session. Thus, in largely the same manner as described above, at step 94, the resource manager may send a rights-acquisition request, and, at step 96, the resource manager may receive from the network server an access-grant. At step 98, the resource manager may then update the rights-acquisition data and thereafter allow access to the data resource.

Through this process, for instance, a user could "add" an additional channel-definition to be used subsequently by the channel-presentation program. Alternatively, the user could "add" a new skin-definition to be used subsequently by the skin-rendering program. Still alternatively, the user could "add" other sorts of data resources.

Figure 7:
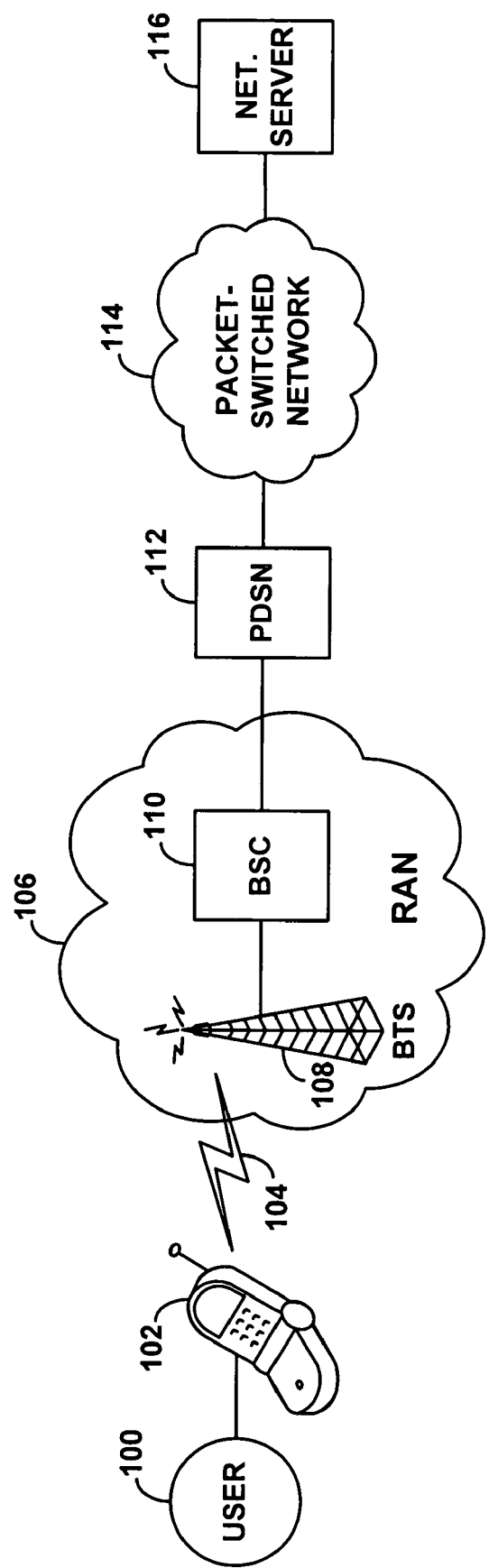
FIG. 7 is a block diagram of a wireless packet-data communication system in which the exemplary embodiment can be implemented.

FIG. 7 next depicts a wireless network arrangement in which a preferred embodiment of the invention can be implemented. In FIG. 7, the computing device is a cell phone 102. Cell phone 102 communicates over an air interface 104 with a radio access network 106, shown to include a base transceiver station (BTS) 108 and base station controller (BSC) 110. The BSC 110 in turn is coupled with a packet data serving node (PDSN) 112 that provides connectivity with a packet-switched network 114. And a network server 116 sits as a node on the packet-switched network 114.

With this arrangement, the rights-acquisition session will flow over the air interface 104, radio access network 106, and packet-switched network 114 between the cell phone 102 and the network server 116. In particular, the cell phone 102 may acquire wireless packet data connectivity in a manner well known in the art and may then engage in IP-based communication with the network server, to send a rights-acquisition request, and to receive an access-grant.

An exemplary embodiment of the invention has been described above. Those skilled in the art will appreciate that changes may be made to the embodiment described without departing from the true spirit and scope of the invention as defined by the claims.

We claim:

1. An apparatus comprising:
    a network communication interface;
    a processor;
    data storage;
    at least one application program stored in the data storage and executable by the processor;
    a plurality of data resources stored in the data storage;
    an access-rights table stored in the data storage and accessible independently of the data resources, the access-rights table including information regarding one or more rights to access each of the data resources by the at least one application program; and
    a resource manager stored in the data storage and executable by the processor to (i) receive a first request, from the at least one application program, for a list of data resources of the plurality,
    (ii) in response to receiving the first request, provide to the at least one application program the list of data resources of the plurality,
    (iii) receive a second request, from the at least one application program, for access to a given data resource of the plurality,
    (iv) in response to receiving the second request, determine from the access-rights table whether a right exists to access the given data resource,
    (v) if the determination is that the right exists to access the given data resource, allow the at least one application program to access the given data resource without first invoking a rights-acquisition session, and
    (vi) if the determination is that the right does not exist to access the given data resource, then invoke the rights-acquisition session via the network communication interface though which to acquire from a network server the right to access the given data resource, wherein invoking the rights-acquisition session includes (a) prompting a user for approval before sending an acquisition request, and (b) sending the acquisition request via the network communication interface to the network server, the acquisition request identifying the given data resource, wherein, through the rights-acquisition session, the resource manager acquires a decryption key to decrypt the given data resource.

2. The apparatus of claim 1, wherein, upon acquisition of the right to access the given data resource, the resource manager is further executable to allow the at least one application program to access the given data resource.

3. The apparatus of claim 1, wherein the access-rights table includes a Boolean flag, respectively for each data resource, indicating whether a right exists to access the data resource.

4. The apparatus of claim 1, wherein the acquisition request comprises a hypertext transfer protocol (HTTP) request.

5. The apparatus of claim 1, wherein, through the rights-acquisition session, the user interacts with the network server to purchase the right to access the given data resource.

6. The apparatus of claim 1, wherein the apparatus is a wireless handheld device, and wherein the network communication interface comprises a wireless communication interface.

7. The apparatus of claim 6, wherein the apparatus is a cellular telephone.

8. The apparatus of claim 1, wherein the at least one application program comprises a channel presentation program, and wherein the given data resource comprises a channel-definition file.

9. The apparatus of claim 1, wherein the at least one application program comprises a skin-rendering program, and wherein the given data resource comprises a skin-definition file.

10. In a wireless communication device having a wireless communication interface, a processor, and data storage, wherein the data storage contains (i) at least one application program executable by the processor, (ii) a resource manager executable by the processor, (iii) a plurality of data resources, and (iv) an access-rights table that is accessible independently of the data resources and that includes information regarding one or more rights to access each of the data resources by the at least one application program, a method comprising:
    the resource manager receiving a first request, from the at least one application program, for a list of data resources of the plurality;
    in response to receiving the first request, the resource manager providing to the at least one application program the list of data resources of the plurality;
    the resource manager receiving a second request, from the at least one application program, for access to a given data resource of the plurality;
    in response to receiving the second request, the resource manager determining from the access-rights table whether a right exists to access the given data resource;
    if the determination is that the right exists to access the given data resource, allow the at least one application program to access the given data resource without first invoking a rights-acquisition session, and
    if the determination is that the right does not exist to access the given data resource, then the resource manager invoking the rights-acquisition session via the network communication interface though which to acquire from, a network server, the right to access the given data resource, wherein invoking the rights-acquisition session includes (i) prompting a user for approval before sending an acquisition request, and (ii) sending the acquisition request via the network communication interface to the network server, the acquisition request identifying the given data resource, wherein, through the rights-acquisition session, the resource manager acquires a decryption key to decrypt the given data resource.

11. The method of claim 10, further comprising, in the rights-acquisition session:
    the resource manager transmitting user payment authorization via the wireless communication interface to the network server; and
    the resource manager receiving from the network server an authorization response allowing access to the given data resource.

12. The method of claim 10, further comprising:
    upon acquisition of the right to access the given data resource, the resource manager allowing the at least one application program to access the given data resource.

13. A method for acquiring access rights to a data resource on a wireless communication device (WCD), wherein the WCD includes an application management system (AMS) and a resource manager, and wherein the WCD stores (i) a plurality of data resources, and (ii) an access-rights table that is accessible independently of the data resources and that includes information regarding one or more rights to access each of the data resources of the plurality, the method comprising:

the AMS receiving a first request from a user to provide a list of data resources available to be added to the WCD;

in response to the AMS receiving the first request, the AMS making a second request of the resource manager for the list of data resources;

in response to receiving the second request, the resource manager returning the list of data resources;

in response to receiving the list of data resources, the AMS presenting the list of data resources to the user;

the AMS receiving, from the user, an indication of a given data resource to add to the WCD, wherein the given data resource is from the list of data resources, wherein the indication specifies approval of the user to add the given resource to the WCD;

in response to receiving the indication from the user, the AMS making a third request to the resource manager to add the given resource to the WCD;

in response to receiving the third request, the resource manager determining whether a right exists to access the given resource;

if the right exists, the resource manager allowing access to the given resource without transmitting a rights-acquisition request; and if the right does not exist, the resource manager (i) transmitting, to a network server, the rights-acquisition request for the given resource, (ii) receiving an access-grant from the network server, wherein the access-grant provides the resource manager with a decryption key to decrypt the given data resource, and (iii) in response to receiving the access-grant, updating the access-rights table to indicate that a right exists to access the given resource.

14. The method of claim 13, wherein the resource manager returning the list of data resources comprises:

the resource manager querying the access-rights table to identify whether the right exists to access the given data resource; and the resource manager returning the list of data resources, wherein the list of data resources contains data resources that do not yet have access rights.

* * * * *